(12) United States Patent
Park

(10) Patent No.: US 6,607,434 B1
(45) Date of Patent: Aug. 19, 2003

(54) VENT GRILL FOR VEHICLE

(75) Inventor: Mun-Gyu Park, Seoul (KR)

(73) Assignee: Kia Motors, Co, LTD, Gyeonggi-Do (KR)

( * ) Notice: Subject to any disclaimer, the term of this patent is extended or adjusted under 35 U.S.C. 154(b) by 0 days.

(21) Appl. No.: 10/167,003

(22) Filed: Jun. 10, 2002

(30) Foreign Application Priority Data

Apr. 18, 2002 (KR) ........................................ 2002-21175

(51) Int. Cl.7 ................................................. B60H 1/34
(52) U.S. Cl. ........................ 454/155; 454/316; 454/324
(58) Field of Search ................................ 454/154, 155, 454/313, 316, 319, 320, 324, 334

(56) References Cited

U.S. PATENT DOCUMENTS

| | | | | |
|---|---|---|---|---|
| 2,466,851 | A | * | 4/1949 | Honekamp et al. .......... 454/311 |
| 2,894,444 | A | * | 7/1959 | Boylan et al. ............... 454/155 |
| 3,426,668 | A | * | 2/1969 | Hofmeister et al. ......... 454/324 |
| 3,861,281 | A | * | 1/1975 | Godwin ...................... 454/155 |
| 4,188,862 | A | * | 2/1980 | Douglas, III ................ 454/324 |

FOREIGN PATENT DOCUMENTS

| | | | | |
|---|---|---|---|---|
| DE | 2 128 987 | * | 1/1973 | ................. 454/155 |

* cited by examiner

Primary Examiner—Harold Joyce
(74) Attorney, Agent, or Firm—David M. Tichane

(57) ABSTRACT

Disclosed is a vent grill for a vehicle capable of simplifying the manufacturing process, decreasing the installation space, and supplying conditioned air extensively. The vent grill comprises a cover fixed to one end of the duct and provided with a circular installing hole and a guide groove formed below the circular installing hole. At the cover, there is installed a main body including an opening through which air is exhausted, plural wings rotatably installed at the opening, an interlocking member connecting the respective wings such that the respective wings are rotated at the same time, and a knob installed at either one of the respective wings. At the rear side of the main body, there is installed an opening and shutting unit including a housing provided with a penetration hole which is installed at a rear of the main body, fixed to the cover, surrounding the main body, for penetrating the air, and having a central shaft formed at a center thereof, a rotational plate rotatably installed at the central axis of the housing, for controlling an opening angle of the penetration hole, and a knob fixed to the rotational plate so as to rotate the rotational plate, and exposed through the guide groove of the cover.

5 Claims, 10 Drawing Sheets

VENT GRILL FOR VEHICLE

BACKGROUND OF THE INVENTION

1. Field of the Invention

The present invention relates to a vent grill for a vehicle, and more particularly, to a vent grill for a vehicle, having a simple structure and a simplified manufacturing process, of which installation space decreases and conditioned air can be extensively supplied.

2. Background of the Related Art

Generally, in order to maintain inner air at a state suitable for a driver, most of vehicles are provided with air conditioning units, such as an air conditioner for supplying cooled air into the interior space, and a heater for supplying heated air. These air conditioning units are connected with ducts so as to introduce conditioned air into the interior space. Naturally, the duct is provided with a vent grill for controlling amount and direction of air as supplied as well as finally supplying the conditioned air into the interior space of the vehicle, at one end thereof.

As shown in FIGS. 1 to 4, a vent grill is provided with a housing 1 inserted into or fixed to one end of a duct. On the front of the housing 1, there is provided a front member 2 for forming a front portion of the vent grill. An opening and shutting unit 3 for supplying or blocking air controlled by an air conditioner is operably installed in the housing 1. The opening and shutting unit 3 is provided with a rotational knob 3a rotatably installed in the front member 2, a connector 3b movably connected with one end of the rotational knob 3a, and an opening and shutting plate 3c rotatably installed in the connector 3b so as to control a supply of conditioned air. Also, a horizontal grill member 4 is installed at the front member 2 so as to filter air introduced through the housing 1 and control air direction upward or downward. The respective horizontal grill members 4 are connected with each other through an interlocking member 4a, and thus they are interlocked along the same direction. Further, Inside the housing 1, there is installed a plurality of vertical grill members 5 for controlling left and right supply direction of the conditioned air. The respective vertical grill members 5 are also connected with each other through an interlocking member 5a, and thus they are interlocked along the same direction. Among the vertical grill members 5, the central vertical grill member 5 is connected with a knob 6 for controlling the respective vertical grill members in left and right directions. This knob 6 is slidingly installed at the central horizontal grill member among the horizontal grill members for stable movement toward left and right.

According to the above constitution, a driver can control supply of conditioned air in the vent grill using the rotational knob 3a of the opening and shutting unit 3, and also can control opening angles of the horizontal grill members 4 and the vertical grill members 5 simultaneously or respectively, thereby supplying the conditioned air in a desired direction.

However, this conventional vent grill for the vehicle causes several problems. First, since the number of elements constituting the vent grill is too many, and their structures are very complicated, the entire coupling structure of the respective elements becomes complicated, so that the manufacturing process thereof is also complicated and there exists a high possibility in that failure in quality is caused.

Further, since the respective horizontal grill members are crossed with the respective vertical grill members, the entire length of the vent grill lengthens, and thus a large installing space is requested.

Furthermore, since the size including the front and rear length lengthens, an energy is lost from the air supplied from the air purifier, so that there occurs a problem in that air purifying efficiency is lowered.

SUMMARY OF THE INVENTION

Accordingly, the present invention is devised to solve the aforementioned problems, and it is an object to provide a vent grill for a vehicle capable of preventing an energy loss of air, decreasing occurrence of trouble, and controlling air in a desired direction in a wide range.

It is another object of the invention to provide a vent grill for a vehicle in which volume thereof decreases and the number of elements and manufacturing processes decrease.

It is a further object of the invention to provide a vent grill for a vehicle having light characteristic in weight, small installing space and high degree of freedom in design thereof.

To accomplish the above objects, there is provided a vent grill for a vehicle installed at one end of a duct connected to an air conditioner of the vehicle, for controlling amount and direction of air supplied to the inside of the vehicle. The vent grill comprises: a cover fixed to said one end of the duct and provided with a circular installing hole and a guide groove formed below the circular installing hole; a main body rotatably installed at the installing hole of the cover, and including an opening through which air is exhausted, plural wings rotatably installed at the opening, an interlocking member connecting the respective wings such that the respective wings are rotated at the same time, and a knob installed at either one of the respective wings; and an opening and shutting unit including a housing provided with a penetration hole which is installed at a rear of the main body, fixed to the cover, surrounding the main body, for penetrating the air, and having a central axis(shaft) formed at a center thereof, a rotational plate rotatably installed at the central axis of the housing, for controlling an opening angle of the penetration hole, and a knob fixed to the rotational plate so as to rotate the rotational plate, and exposed through the guide groove of the cover.

BRIEF DESCRIPTION OF THE DRAWINGS

The above object and other advantages of the present invention will become more apparent by describing in detail preferred embodiments thereof with reference to the accompanying drawings in which.

DETAILED DESCRIPTION OF THE PREFERRED EMBODIMENTS

Hereinafter, there will be described in detail preferred embodiments in accordance with the present invention with reference to the accompanying drawings.

Figure 1:
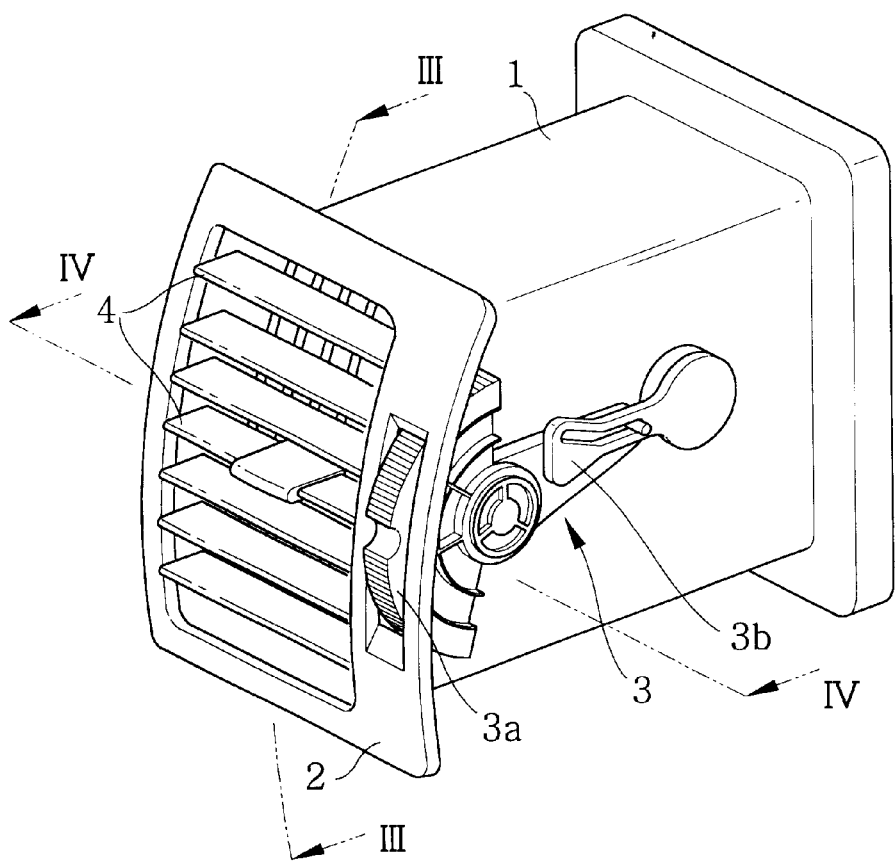
FIG. 1 is a perspective view of a conventional vent grill for a vehicle.
Figure 2:
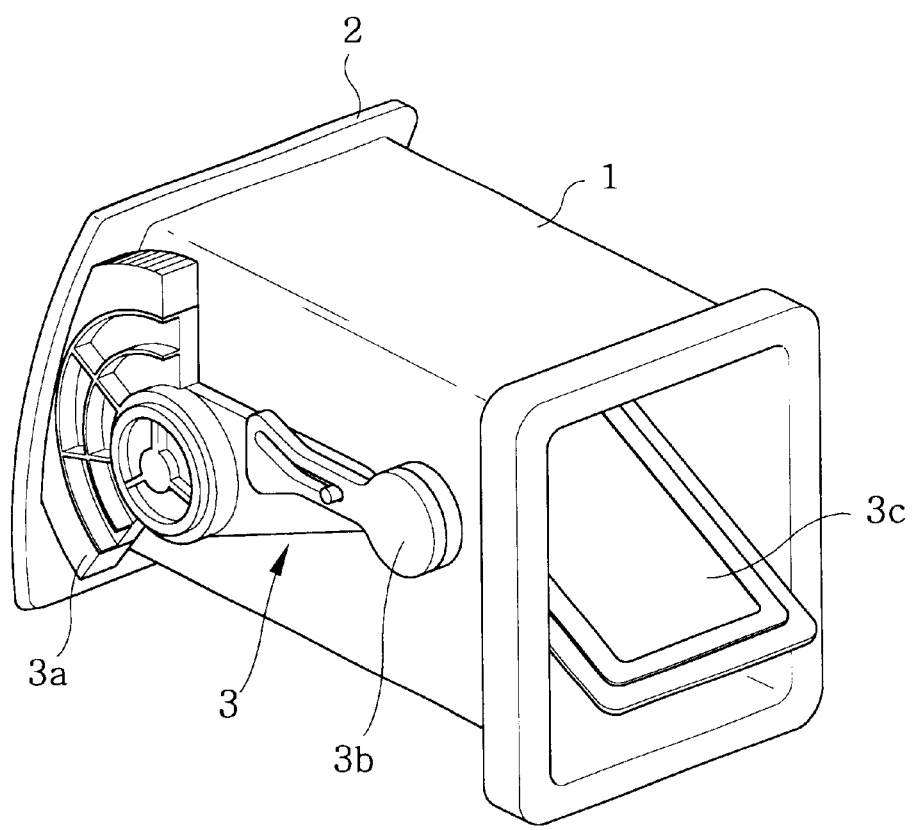
FIG. 2 is a rear perspective view of the vent grill of FIG. 1.
Figure 3:
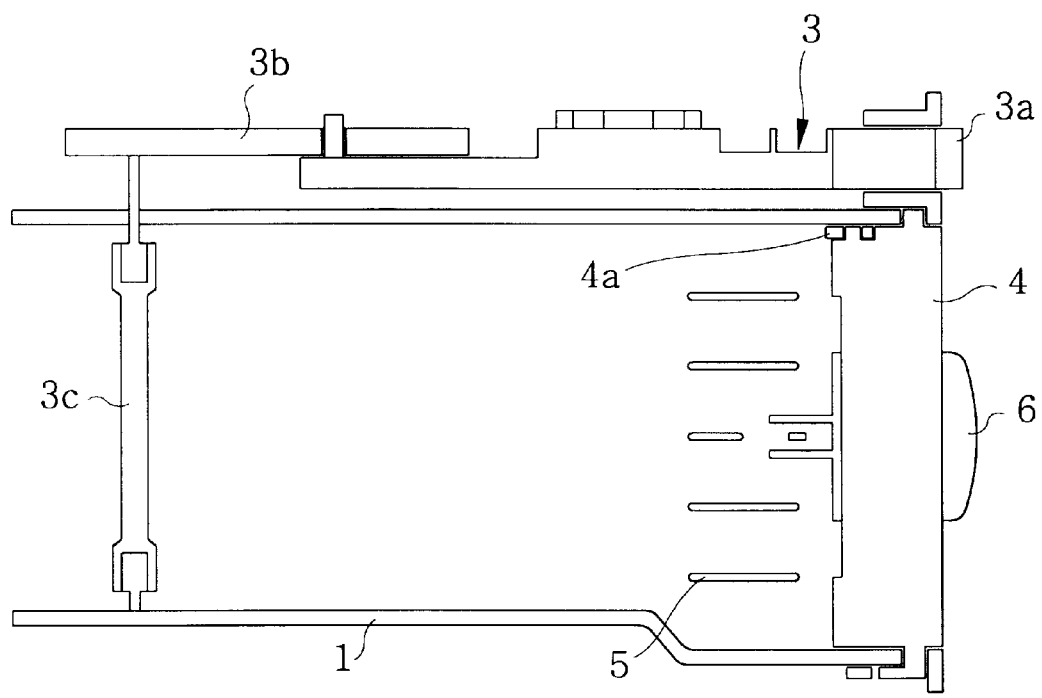
FIG. 3 is a sectional view taken along the line III—III of FIG. 1.
Figure 4:
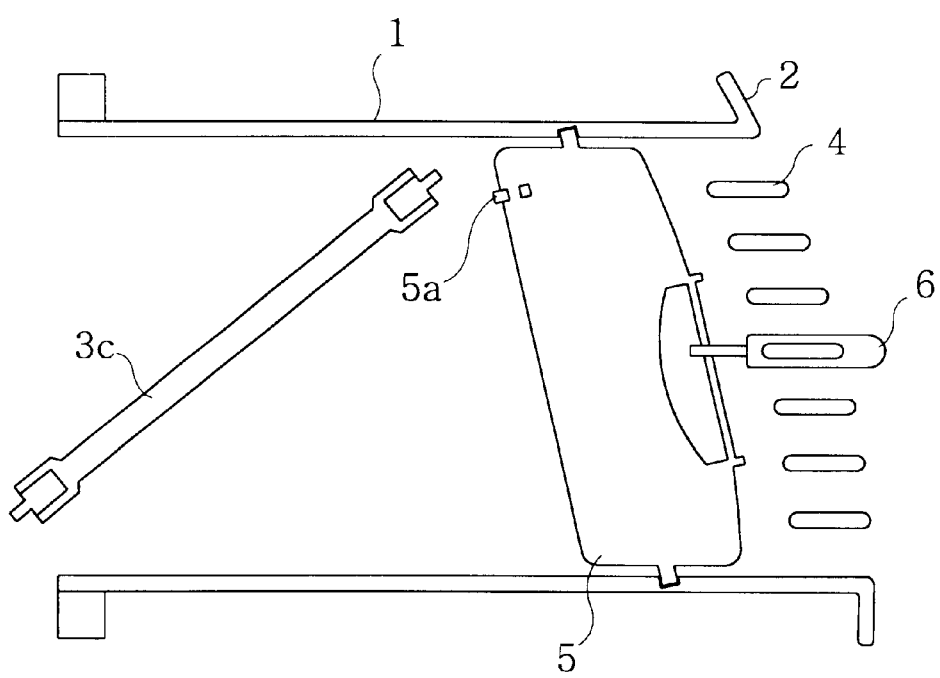
FIG. 4 is a sectional view taken along the line IV—IV of FIG. 1.
Figure 5:
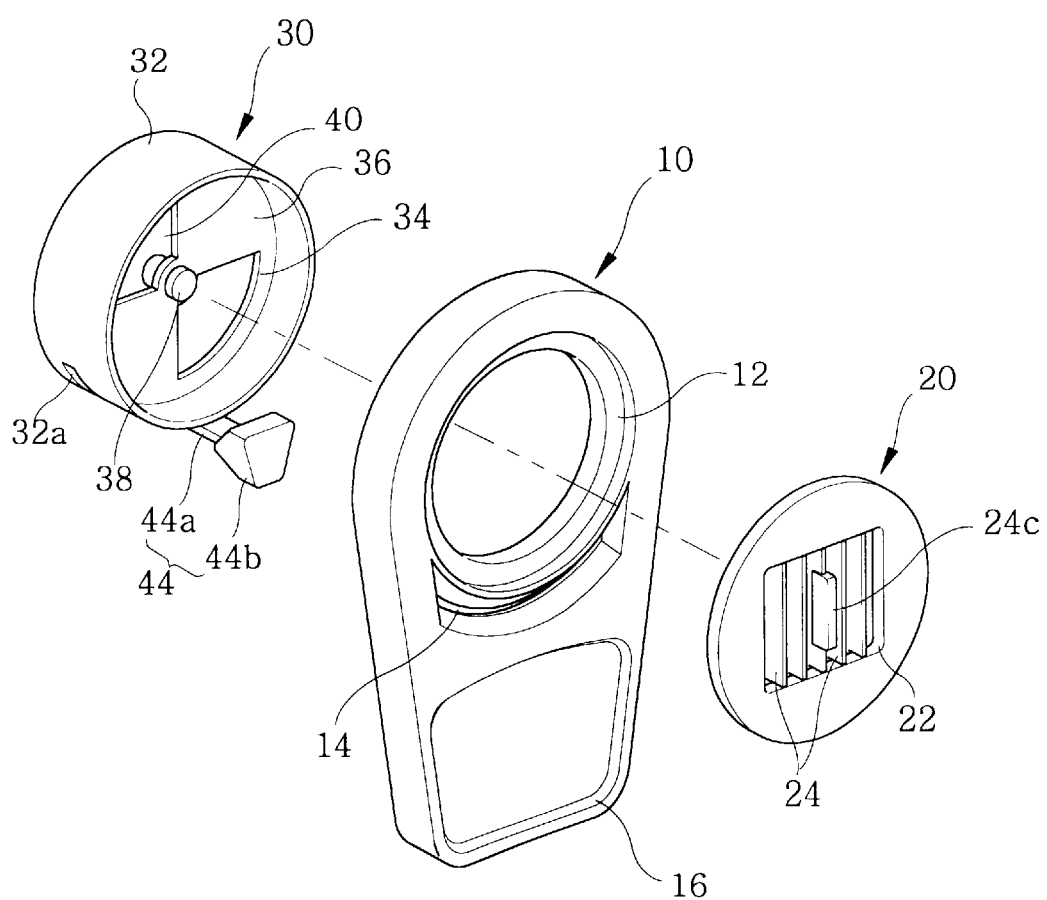
FIG. 5 is a disassembled perspective view of a vent grill for a vehicle in accordance with the present invention.
Figure 8:
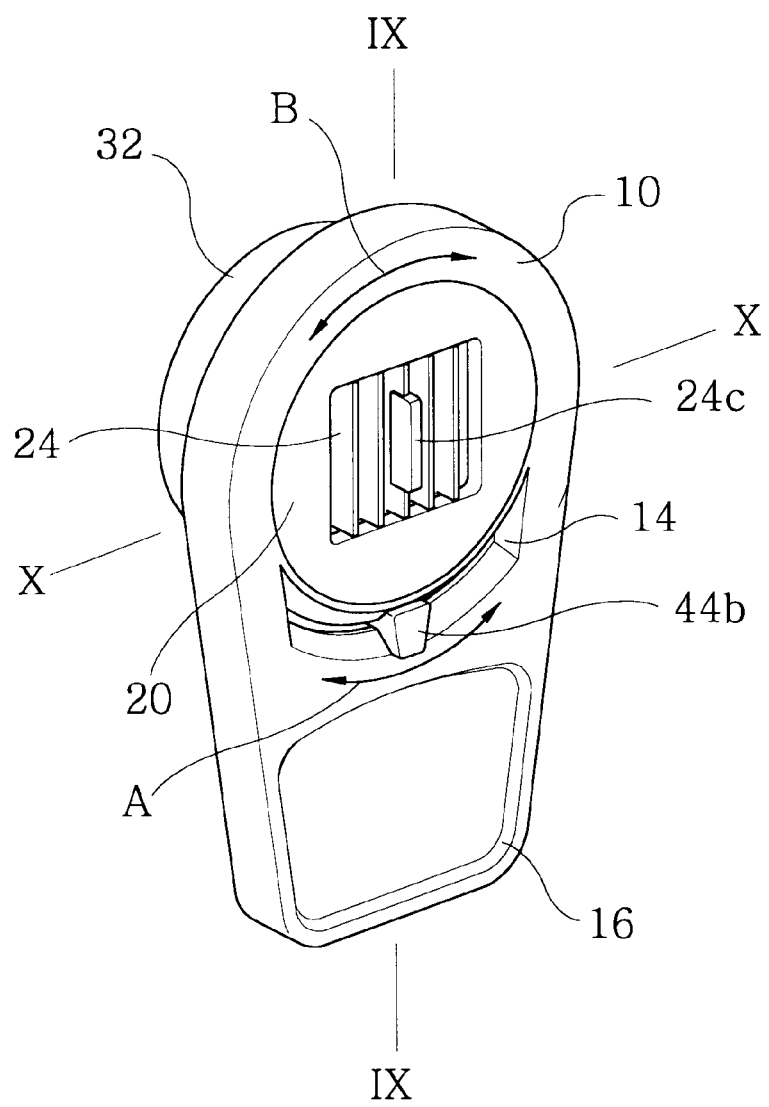
FIG. 8 is a perspective view of the vent grill of FIG. 5 as assembled.
Figure 9:
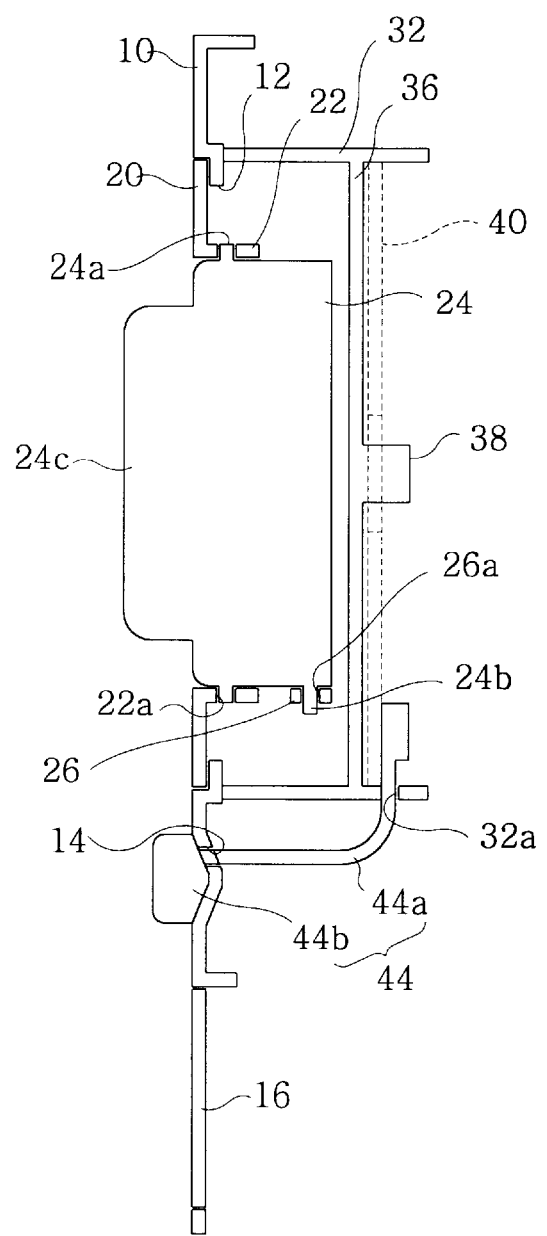
FIG. 9 is a sectional view taken along the line IX—IX of FIG. 8.
Figure 10:
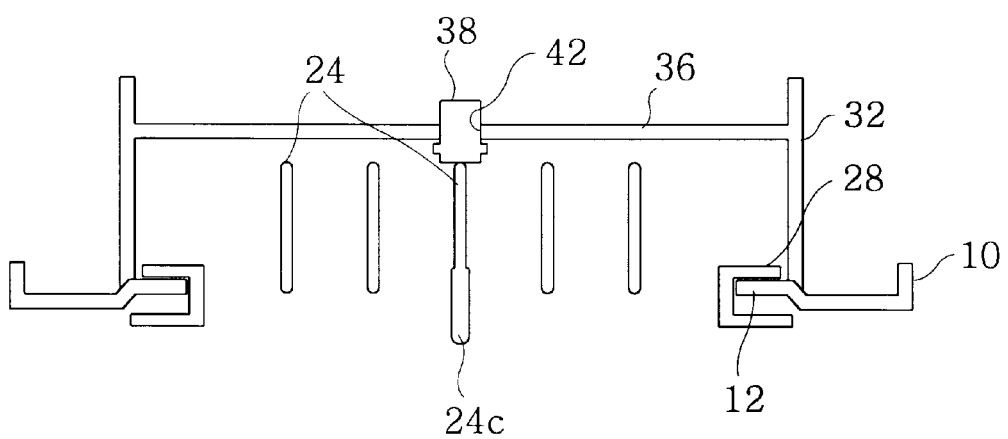
FIG. 10 is a sectional view taken along the line X—X of FIG. 8.

First, referring to FIG. 5 and FIGS. 8 to 10, a vent grill for a vehicle in accordance with a preferred embodiment of the invention, is provide with a cover 10 fixed to one end of a duct connected to an instrument panel or an air conditioner. The cover 10 is disposed ahead of the vent grill, and forms the whole appearance thereof. The cover 10 has a circular installation hole 12 formed at an upper portion thereof. Also, a guide groove 14 having a curved shape is disposed below the circular installation hole 12 at a constant size. Length of the guide groove 14 is preferably set to such a degree to sufficiently control opening and shutting degree of an opening and shutting unit to be described later. Selectively, the cover 10 may have an installation hole 16 at a lower portion thereof so as to install an additional element or device for the vehicle.

Figure 6:
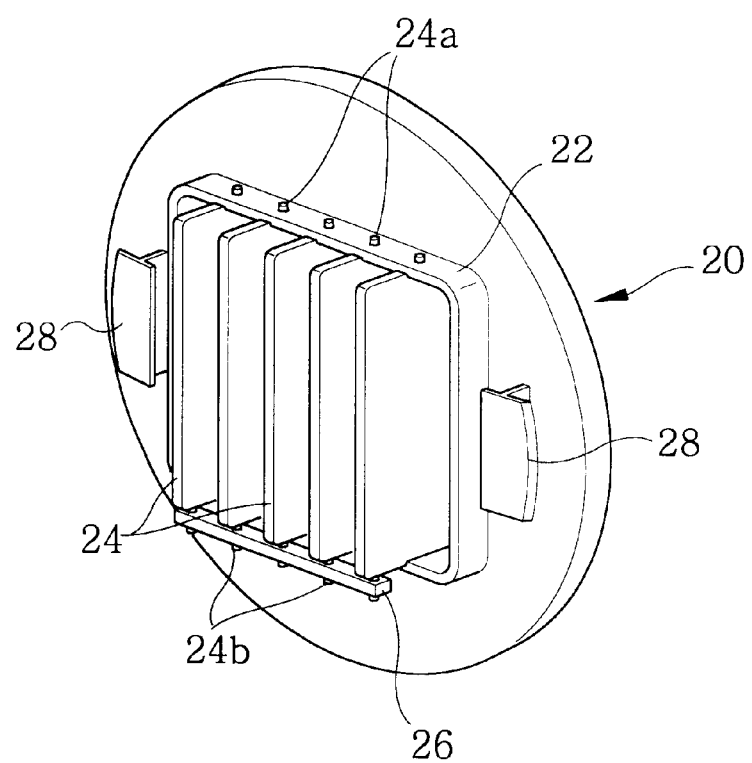
FIG. 6 is a rear view of a main body of the vent grill of FIG. 5.

Referring to FIGS. 5, 6, and 8 to 10, a main body 20 is installed in the cover 10. In particular, the main body 20 is rotatably installed in the circular installation hole 12. A rectangular opening 22 is formed in the main body 20. A plurality of grill pieces or wings 24 are rotatably installed at the rectangular opening 22 within a certain angle range. In other words, a plurality of fixing holes 22a facing each other are respectively penetration-formed at upper side and lower side of the rectangular opening 22, and a plurality of fixing pieces protruded from both ends of the respective wings 24 are rotatably inserted into the fixing holes 22a. Thus, the respective wings 24 are rotatably installed with respect to the rectangular opening 22, thereby enabling to control air direction through the opening 22.

In particular, in order to rotate the respective wings 24 at the same time, an interlocking member 26 is installed at upper portion or lower portion of the respective wings 24 at one side of the wings. In other words, protruded pieces 24b are formed at upper ends or lower ends of the respective wings 24, and insertion holes into which the respective protruded pieces 24b are rotatably inserted are formed at the interlocking member 26, so that the respective wings become rotatable in bidirections at the same time. Selectively, in front of one of the respective wings 24, preferably the wing positioned at the center thereof, a knob 24c is preferably installed integrally with the wings 24. Accordingly, driver or passenger can adjust directions of the wings 24 using this knob 24. Naturally, it is preferably to form fixing pieces at both sides of the rear surface of the main body 20 such that the main body 20 is attachably and detachably fixed to the installing hole 12 of the cover 10.

Figure 7:
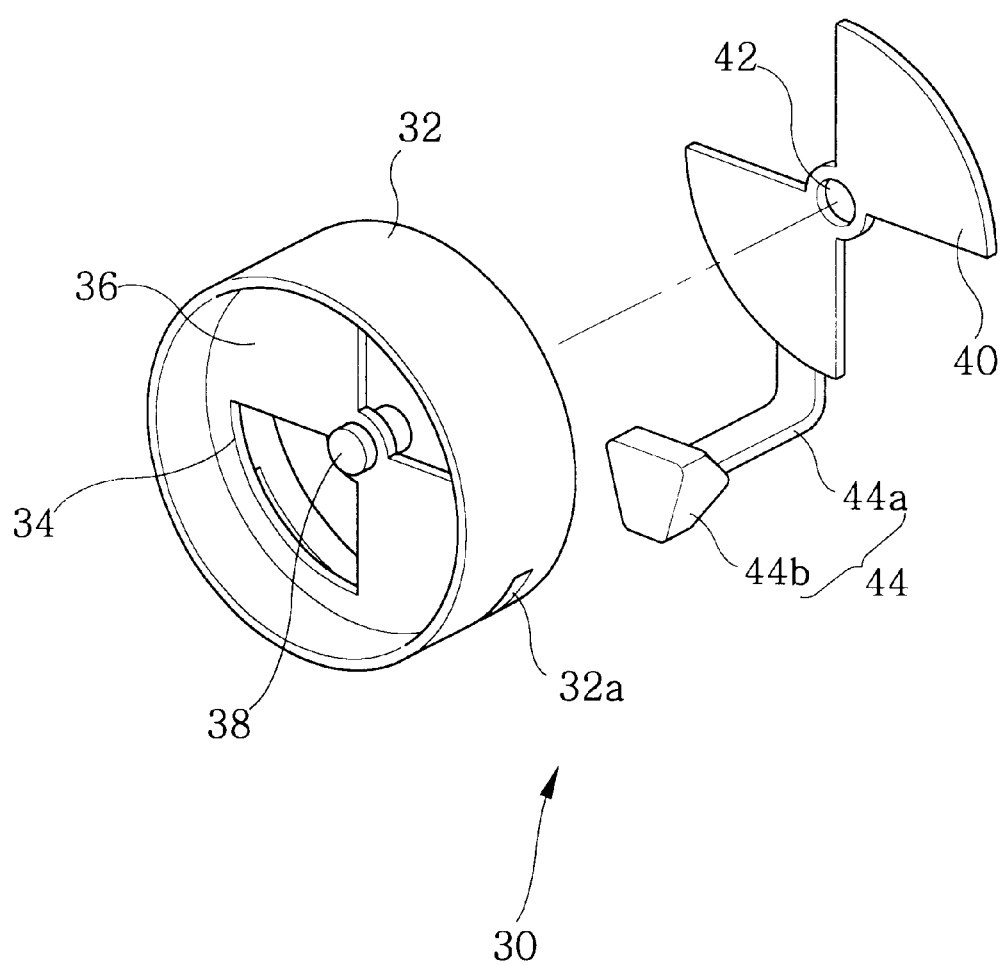
FIG. 7 is a disassembled perspective view of an opening and shutting unit of the vent grill of FIG. 5.

Referring to FIGS. 5 and 7 to 10, at the rear side of the main body 20, there is provided an opening and shutting unit 30. The opening and shutting unit 30 is fixed to the cover 10 so as to surround the main body 20 from the rear side of the main body 20. The opening and shutting unit 30 is provided with a cylindrical housing 32 for surrounding the main body 20.

Inside the housing 32, there is formed an air blocking part 36 for blocking introduction of air differently from a penetration hole 34 for introducing air. The penetration hole 34 and the blocking part 36 are made in a fan shape or a quarter circular shape. A central shaft 38 is protrusion-formed at the center of the air blocking part 36. Also, a penetration hole 32a having an appropriate size is penetration-formed at a predetermined position of the housing 32.

A rotational plate 40 for controlling opening and closing of the penetration hole 34 is rotatably installed in the housing 32. The rotational plate 40 is preferably formed in a similar pattern and size to the penetration hole 34 so as to completely close the penetration hole 34. A fixing hole 42 is penetrated at the center of the rotational plate 40 such that the rotation plate is rotatably inserted into the central shaft 38. Particularly, the rotation plate has a knob 44 so that driver or passenger can rotate the rotational plate 40. The knob 44 includes a connecting rod 44a of which one end is fixed to the rotational plate 40, and movably inserted into the penetration hole 32a of the housing 32 and the guide groove 14 of the cover 10, and a grasp part 44b fixed to the other end of the connecting rod 44a and capable of being manipulated by the driver grasping or contacting it. The grasp part 44b can be formed integrally with or coupled separately from the connecting rod 44a.

Hereinafter, there are described operation and operation modes of the vent grill having the above structure.

First, the vent grill of the invention is connected to one end of the duct (not shown). In this installation state, when driver or passenger wishes to be supplied with controlled air in a desired condition, driver or passenger rotates the rotational plate 40 as indicated by arrow "A" using the grasp part 44b of the knob 44 to thereby open the penetration hole 34 of the opening and shutting unit 30. Of course, at this time, the driver or passenger can control introduction amount of air by controlling a rotational range of the rotational plate 40.

In a state where the penetration hole 34 is open, air passing through the penetration hole 34 passes through the respective wings 24 of the main body 20 installed in front of the penetration hole 34, and is supplied into the interior of the vehicle. At this time, the driver or passenger rotates the knob 24c installed at the center of the wings 24 in left or right direction, or aligns the knob 24c at the center position to thereby control the supply direction of the air. At this time, the respective wings 24 are simultaneously rotated in the same direction by the interlocking member 26, so that the supply direction of the air is controlled.

Also, the driver or passenger can rotate the main body 20 in a desired direction as indicated by arrow "B", so that the air can be supplied in all directions including left, right, upper and lower sides. At this time, the main body 20 can be easily and stably rotated by the fixing piece 28 with respect to the installation hole 12 of the cover 10.

Accordingly, the driver or passenger can properly control the supply amount of the air using the knob of the opening and shutting unit, and discharge direction of the air with respect to the all azimuthal angles by using the knob of the main body.

Resultantly, according to a vent grill for a vehicle in accordance with the present invention, structure and constitution are simple and thus occurrence frequency of trouble becomes small. Also, it becomes possible to control air in a desired direction extensively and easily, so that quality of the product is enhanced.

Further, since the grill main body and the opening and shutting unit are all operatively installed at the cover, volume thereof and the number of elements decrease, so that productivity and workability are enhanced.

Furthermore, the decrease in the number of the elements enables lightness in the weight of the vent grill, decreases the installation space and increases the degree of freedom in the design thereof.

Although the preferred embodiments of the present invention have been disclosed for illustrative purposes, those skilled in the art will appreciate that various modifications, additions and substitutions can be made without departing from the scope and spirit of the invention as disclosed in the accompanying claims.

What is claimed is:

1. A vent grill for a vehicle, installed at one end of a duct connected to an air conditioner unit of the vehicle, for controlling amount and direction of air supplied to the inside of the vehicle, the vent grill comprising:

a cover fixed to the one end of the duct and provided with a circular installing hole and a guide groove formed below the circular installing hole;

a main body rotatably installed at the installing hole of the cover, and including an opening through which air is exhausted, plural wings rotatably installed at the opening, an interlocking member connecting the respective wings such that the respective wings are rotated at the same time, and a knob installed at either one of the respective wings; and an opening and shutting unit including a housing provided with a penetration hole which is installed at a rear of the main body, fixed to the cover, surrounding the main body, for penetrating the air, and having a central shaft formed at a center thereof, a rotational plate rotatably installed at the central axis of the housing, for controlling an opening angle of the penetration hole, and a knob fixed to the rotational plate so as to rotate the rotational plate, and exposed through the guide groove of the cover.

2. The vent grill as claimed in claim 1, wherein said main body comprises multiple fixing holes penetrated at upper and lower portions of the opening and facing each other, and said wings comprise protruded and fixed pieces rotatably inserted into the fixing hole at both side ends thereof.

3. The vent grill as claimed in claim 1, wherein the respective wings have respective protruded pieces formed at the upper or lower portion of the wing, and the interlocking member has insertion holes into which the respective protruded pieces are rotatably inserted.

4. The vent grill as claimed in claim 1, wherein the main body comprises fixing pieces formed at both sides of the rear surface of the main body, attachable and detachable to a periphery of the installing hole of the cover, and movably installed along the periphery.

5. The vent grill as claimed in claim 1, wherein the housing of the opening and shutting unit comprises penetration holes formed along a circumference of the housing, and the knob fixed to the rotational plate comprises a connecting rod of which one end is fixed to the rotational plate, for penetrating the penetration holes and the guide groove of the cover, and a grasp part fixed to the other end of the connecting rod and exposed to a front of the cover.

* * * * *